United States Patent

Snowbarger et al.

[11] Patent Number: 5,966,679
[45] Date of Patent: Oct. 12, 1999

[54] METHOD OF AND APPARATUS FOR NONOBTRUSIVELY OBTAINING ON-LINE MEASUREMENTS OF A PROCESS CONTROL DEVICE PARAMETER

[75] Inventors: Jimmie L. Snowbarger; Eugene R. Taylor, Jr.; Bruce F. Grumstrup, all of Marshalltown; Kenneth W. Junk, Ames, all of Iowa

[73] Assignee: Fisher Controls International, Inc., Clayton, Mo.

[21] Appl. No.: 08/939,364

[22] Filed: Sep. 29, 1997

Related U.S. Application Data

[63] Continuation-in-part of application No. 08/549,998, Oct. 30, 1995, Pat. No. 5,687,098.
[51] Int. Cl.$^6$ .................................................. G01M 19/00
[52] U.S. Cl. ......................... 702/105; 702/41; 73/168; 364/528.17
[58] Field of Search ............................... 702/105, 57, 41; 364/528.17, 172; 73/168; 137/554

[56] References Cited

U.S. PATENT DOCUMENTS

| | | | |
|---|---|---|---|
| 4,029,122 | 6/1977 | Jaegtnes | 137/551 |
| 4,313,465 | 2/1982 | Holzem et al. | 137/599 |
| 4,376,450 | 3/1983 | Fayfield et al. | 137/554 |
| 4,523,286 | 6/1985 | Koga et al. | 364/494 |
| 4,542,649 | 9/1985 | Charbonneau et al. | 73/168 |

(List continued on next page.)

FOREIGN PATENT DOCUMENTS

| | | |
|---|---|---|
| 0 275 629 A1 | 7/1988 | European Pat. Off. |
| 0 315 391 A2 | 5/1989 | European Pat. Off. |
| 0 462 432 A2 | 12/1991 | European Pat. Off. |
| 0 572 245 A2 | 12/1993 | European Pat. Off. |
| 0 637 713 A1 | 2/1995 | European Pat. Off. |
| 0 660 017 A1 | 6/1995 | European Pat. Off. |
| 0 708 389 A1 | 4/1996 | European Pat. Off. |
| 42 18 320 A1 | 6/1992 | Germany . |
| 42 32 826 C1 | 9/1992 | Germany . |
| 62-229 044 | 10/1987 | Japan . |
| 2 194 648 | 3/1988 | United Kingdom . |
| 2 196 445 | 4/1988 | United Kingdom . |
| WO 97/16776 | 5/1997 | WIPO . |

OTHER PUBLICATIONS

FIELDVUE™, "Digital Valve Controller Type DVC5000 Series," Instruction Manual, Jun. 1995.

FIELDVUE™, "Digital Vave Controller Type DVC5000 Series," Bulletin 62.1:DVC5000, Jun. 1994.

FIELDVUE™, "Digital Valve Controller DVC5000 Series Remotely Accessible Information," Bulletin 62.1:DVC5000(S1), Jun. 1994.

U.S. application No. 06/913,193 entitled "Motor Current Signature Analysis Method for Diagnosing Motor–Operated Devices".

Charbonneau, Arthur G., "Early Diagnosis of Motor Operated Valve Mechanical and Electrical Degradations," The American Society of Mechanical Engineers, 84–NE–16, 1984.

(List continued on next page.)

*Primary Examiner*—John Barlow
*Assistant Examiner*—Hien Vo
*Attorney, Agent, or Firm*—Marshall, O'Toole, Gerstein, Murray & Borun

[57] ABSTRACT

An apparatus for nonobtrusively determining one or more parameters, such as dead band, dead time, or response time of a process control device that is connected on-line in a process control loop includes a measurement unit and a processing unit. The measurement unit is coupled to the process control loop to detect stochastic changes in a control signal sent to the process control device and to detect an indication of the response of the process control device to the changes in the control signal while the process control device is operating on-line. The processing unit calculates the device parameters from one or more sets of the detected changes in the control signal and the detected response indication.

32 Claims, 4 Drawing Sheets

U.S. PATENT DOCUMENTS

| | | | |
|---|---|---|---|
| 4,555,766 | 11/1985 | Wright | 364/426 |
| 4,590,963 | 5/1986 | Gardner et al. | 137/554 |
| 4,615,722 | 10/1986 | Steffan et al. | 65/158 |
| 4,617,960 | 10/1986 | More | 137/554 |
| 4,660,416 | 4/1987 | Charbonneau et al. | 73/168 |
| 4,672,529 | 6/1987 | Kupersmit | 364/130 |
| 4,690,003 | 9/1987 | McNennamy et al. | 73/862.32 |
| 4,693,113 | 9/1987 | McNennamy et al. | 73/168 |
| 4,694,390 | 9/1987 | Lee | 364/165 |
| 4,694,391 | 9/1987 | Guttag et al. | 364/200 |
| 4,712,071 | 12/1987 | Charbonneau et al. | 324/415 |
| 4,742,713 | 5/1988 | Abe et al. | 73/620 |
| 4,831,873 | 5/1989 | Charbonneau et al. | 73/168 |
| 4,833,593 | 5/1989 | Takeuchi et al. | 364/191 |
| 4,858,103 | 8/1989 | Takeuchi et al. | 364/174 |
| 4,908,774 | 3/1990 | Lund et al. | 364/507 |
| 4,908,775 | 3/1990 | Palusamy et al. | 364/508 |
| 4,916,628 | 4/1990 | Kugler | 364/492 |
| 4,926,903 | 5/1990 | Kawai | 137/554 |
| 4,949,288 | 8/1990 | Bookout | 364/558 |
| 4,976,144 | 12/1990 | Fitzgerald | 73/168 |
| 4,977,778 | 12/1990 | Nafziger et al. | 73/168 |
| 4,980,825 | 12/1990 | Tootell et al. | 364/580 |
| 5,000,040 | 3/1991 | Charbonneau et al. | 73/168 |
| 5,086,273 | 2/1992 | Leon | 324/207 |
| 5,109,692 | 5/1992 | Fitzgerald | 73/168 |
| 5,140,263 | 8/1992 | Leon | 324/207 |
| 5,154,080 | 10/1992 | Hill et al. | 73/597 |
| 5,159,835 | 11/1992 | Nafziger et al. | 73/584 |
| 5,197,328 | 3/1993 | Fitzgerald | 73/168 |
| 5,198,973 | 3/1993 | Stautermann | 364/167.01 |
| 5,228,342 | 7/1993 | McShane | 73/597 |
| 5,233,542 | 8/1993 | Höhner et al. | 364/551.01 |
| 5,251,148 | 10/1993 | Haines et al. | 364/509 |
| 5,253,185 | 10/1993 | Mutchler et al. | 364/551.01 |
| 5,272,647 | 12/1993 | Hayes | 364/551.01 |
| 5,320,123 | 6/1994 | Corso et al. | 137/1 |
| 5,329,465 | 7/1994 | Arcella et al. | 364/551.01 |
| 5,329,956 | 7/1994 | Marriott et al. | 137/15 |
| 5,337,262 | 8/1994 | Luthi et al. | 364/580 |
| 5,396,167 | 3/1995 | Leon | 324/73.1 |
| 5,414,648 | 5/1995 | Morgan et al. | 364/563 |
| 5,425,270 | 6/1995 | McDonald et al. | 73/168 |
| 5,433,245 | 7/1995 | Prather et al. | 137/554 |
| 5,451,923 | 9/1995 | Seberger et al. | 340/310.06 |
| 5,475,299 | 12/1995 | Leon | 324/73.1 |
| 5,477,149 | 12/1995 | Spencer et al. | 324/418 |
| 5,487,302 | 1/1996 | Casada et al. | 73/168 |
| 5,555,171 | 9/1996 | Sonehara et al. | 364/424.03 |
| 5,557,546 | 9/1996 | Fukai et al. | 364/551.01 |
| 5,564,470 | 10/1996 | Denmark et al. | 137/554 |
| 5,586,305 | 12/1996 | Eidson et al. | 395/500 |
| 5,687,098 | 11/1997 | Grumstrup et al. | 364/551.01 |

OTHER PUBLICATIONS

Dimmick, Joseph, et al., "Ultrasonic Leak Detection Cuts Valve Maintenance Costs," Power Engineering, pp. 35–38, Aug. 1986.

Electric Power Research Institute, "Improvements in Motor– operated Valves," EPRI NP–4254, Nov. 1985.

Electric Power Research Institute, "Key Valves Prioritization Study," EPRI NP–3611, Oct. 1984.

Beatty, "Intelligent Valve Based Process Sensing and Control," *ISA*, 46 *Advances in Instrumentation and Control* No. 2, pp. 1175–1185 (1991).

PCT/US 98/19375 International Search Report dated Feb. 5, 1999.

PCT/US 98/19430 International Search Report, dated Jan. 5, 1999.

METHOD OF AND APPARATUS FOR NONOBTRUSIVELY OBTAINING ON-LINE MEASUREMENTS OF A PROCESS CONTROL DEVICE PARAMETER

RELATED APPLICATION

This is a continuation-in-part of U.S. patent application Ser. No. 08/549,998 filed Oct. 30, 1995 and issued as U.S. Pat. No. 5,687,098.

TECHNICAL FIELD

The present invention relates generally to valve positioners and, more particularly, to a method of and an apparatus for measuring a parameter of a process control device that is connected on-line within a process environment.

BACKGROUND ART

Large scale commercial manufacturing and refining processes typically use a process controller to control the operation of one or more process control devices such as valve mechanisms which, in turn, control one or more process variables comprising, for example, fluid flow, temperature, pressure, etc., within the process. Generally, each process control device has an actuator controlled by a positioner that moves an associated control element, such as a valve plug, a damper, or some other alterable opening member in response to a command signal generated by the process controller. The control element of a process control device may, for example, move in response to changing fluid pressure on a spring biased diaphragm or a piston or in response to the rotation of a shaft, each of which may be caused by a change in the command signal. In one standard valve mechanism, a command signal with a magnitude varying in the range of 4 to 20 mA (milliamperes) causes a positioner to alter the amount of fluid and thus, the fluid pressure, within a pressure chamber in proportion to the magnitude of the command signal. Changing fluid pressure in the pressure chamber causes a diaphragm to move against a bias spring which, in turn, causes movement of a valve plug coupled to the diaphragm.

Process control devices usually develop or produce a feedback signal indicative of the response of the device to the command signal and provide this feedback signal (or response indication) to the process controller for use in controlling a process. For example, valve mechanisms typically produce a feedback signal indicative of the position (e.g., travel) of a valve plug, the pressure within a fluid chamber or the value of some other phenomena related to the actual position of the valve plug.

While a process controller generally uses these feedback signals, along with other signals, as inputs to a highly tuned, centralized control algorithm that effects overall control of a process, it has been discovered that poor control loop performance may still be caused by poor operating conditions of the individual control devices connected within the control loop. In many cases, problems associated with one or more of the individual process control devices cannot be tuned out of the control loop by the process controller and, as a result, the poorly performing control loops are placed in manual or are detuned to the point where they are effectively in manual. The processes associated with these control loops require constant supervision by one or more experienced human operators, which is undesirable.

Poor control loop performance can usually be overcome by monitoring the operational condition or the "health" of each of the process control devices connected within the loop, or at least the most critical process control devices connected within the loop, and repairing or replacing the poorly performing process control devices. The health of a process control device can be determined by measuring one or more parameters associated with the process control device and determining if the one or more parameters is outside of an acceptable range.

One process control device parameter that may be used to determine, and that is indicative of the health of a process control device is dead band. Generally speaking, in process instrumentation, dead band is the range through which an input signal may be varied, upon reversal of direction, without initiating an observable change in an output signal. Dead band, which may be caused by the physical play between mechanically interconnected components, friction, and/or other known physical phenomena, is best observed when a command signal causes a reversal in the direction of movement of a moveable element of a process control device. During this reversal, the command signal undergoes a discrete amount of change (dead band) before the movable element of the process control device actually exhibits movement in the new direction. Put another way, the difference between the value of the command signal (or other control signal) at which movement of the process control device element in a first direction last occurred and the value of the command signal (or other control signal) at which the movement of the process control device element first occurs in a second and different direction is a measure of the dead band of the process control device.

Other device parameters that may be used to determine the health of a process control device are dead time and response time. Dead time is associated with, and may be considered to be a measurement of the amount of time it takes the process control device to actually begin moving a moveable element in response to a change in a control signal. Response time is the amount of time it takes the moveable element of a process control device to reach a certain percentage, for example 63 percent, of its final value in response to a change in a control signal.

If the dead band, dead time, response time, or other process control device parameter(s) of a process control device increase a significant amount over their calibrated values, it may be necessary to repair or replace the process control device to establish adequate control within the process control loop. However, it is not usually very easy to measure process control device parameters, such as dead band, dead time, and response time to monitor the health of functioning process control devices when those devices are connected on-line within a control loop.

In the past, operators have had to remove a process control device from a control loop to bench test the device or, alternatively, control loops have been provided with bypass valves and redundant process control devices to make it possible to bypass a particular process control device to thereby test that device while the process is operating. Alternatively, operators have had to wait until a process is halted or is undergoing a scheduled shut-down to test the individual process control devices within the process. Each of these options is time consuming, expensive, and still only provides intermittent measurement of the parameters of the individual process control devices required to determine the health of those control devices.

SUMMARY OF THE INVENTION

The present invention is directed to a method of and an apparatus for nonobtrusively determining one or more device parameters, such as dead band, dead time, or response time of a process control device while the process control device is connected on-line in a process control loop. Operation of the method and apparatus of the present invention enables a process operator to nonobtrusively monitor the health of one or more process control devices within a process in a continuous manner without having to remove the process control devices from the control loop, without having to bypass the process control devices in the control loop, without having to introduce exogenous control signals into the control loop and without having to shut the process down or interfere with the process in any other way.

According to one aspect of the present invention, an apparatus for determining a device parameter associated with a process control device when the process control device is connected on-line within a process includes a measurement device that nonobtrusively detects changes in a control signal and that nonobtrusively detects or measures an indication of the response of the process control device to the changes in the control signal while the process control device is operating on-line. The apparatus also includes a processing unit (which may be implemented in software or hardware) that ascertains or calculates the device parameter from the detected changes in the control signal and the response indication. The control signal may be a command signal delivered to the device, a set point signal, an error signal or any other signal used to control a process control device. The response indication may be position (e.g., valve travel), an indication of a process variable or any other desired signal. If desired, an operator may intentionally introduce a change in a set point, a control signal, etc., to force changes within the system and, thereby, to force one or more measurements of dead time, response time or dead band according to the present invention.

If the apparatus determines the dead band for the process control device, the processing unit preferably detects a reversal in the direction of movement of the process control device and determines the change in the magnitude of the control signal necessary to cause a change in the response indication immediately after occurrence of the direction reversal. If the apparatus detects the dead time or the response time of the process control device, the processing unit preferably includes software or circuitry that detects a change in the control signal over a predetermined amount and a clock that measures the amount of time it takes the response indication to begin to move or to reach a predetermined percentage of its final value in response to the change in the control signal.

The processing unit may disable the determination of the device parameter when the control signal changes at a rate greater than a specified rate and/or when the response indication falls outside of a valid range. Also, the processing unit may include software or circuitry that alerts an operator when the determined device parameter fails to meet a predetermined criteria, for example, when the device parameter is greater than a predetermined value.

According to another aspect of the present invention, a method of determining a device parameter associated with a process control device when the process control device is connected on-line within a process includes the steps of nonobtrusively detecting a change in a control signal that is used to control the process control device, nonobtrusively measuring an indication of the response of the process control device to the change in the control signal and ascertaining the device parameter from the detected change in the control signal and from the response indication.

DETAILED DESCRIPTION

Figure 1:
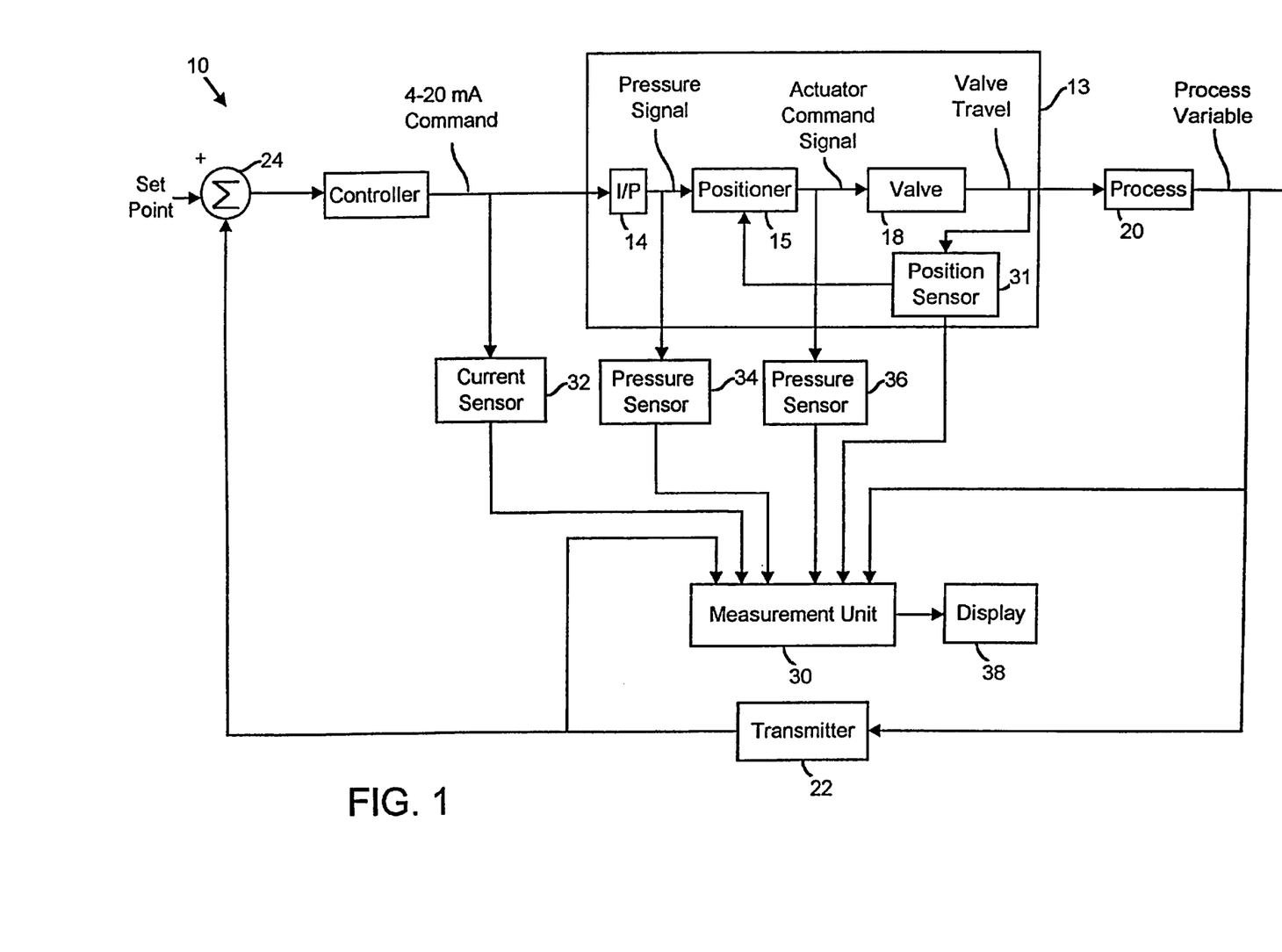
FIG. 1 comprises a block diagram of a control loop and apparatus for nonobtrusively determining a parameter of a process control device according to the present invention.

Referring to FIG. 1, a typical single-input, single-output process control loop 10 includes a process controller 12 that sends, for example, a 4 to 20 mA command signal to a process control device 13 illustrated as including a current-to-pressure transducer (I/P) 14 that (typically) sends a 3 to 15 psig pressure signal to a valve positioner 15 which, in turn, pneumatically controls a valve 18 with a pressure signal (air). Operation of the valve 18 controls the articulation of a movable valve member disposed therein (not shown) that, in turn, controls a process variable within a process 20. However, the process control device 13 may include any other type of valve mechanisms or elements instead of or in addition to those illustrated in FIG. 1 including, for example, an electronic positioner having an I/P unit integrated therein. Furthermore, it should be understood that the process control device 13 may be any other type of device (besides a valve controlling device) that controls a process variable in any other desired or known manner and may be, for example, a damper, etc.

As illustrated in FIG. 1, a transmitter 22 measures the process variable of the process 20 and transmits an indication of the measured process variable to a summing junction 26. The summing junction 26 compares the measured value of the process variable (converted into a normalized percentage) to a set point to produce an error signal indicative of the difference therebetween and provides this error signal to the process controller 12. The set point, which may be generated by a user, an operator or another controller is typically normalized to be between 0 and 100 percent and indicates the desired value of the process variable. The process controller 12 uses the error signal to generate the command signal according to any desired technique and delivers the command signal to the process control device 13 to thereby effect control of the process variable.

A device parameter measurement unit 30 which may be internal or external to the positioner 15 measures or detects a control signal that is delivered to or that is used to control the process control device 13 and detects an indication of the response of the process control device 13 to the control signal (a response indication) which may be developed by, for example, a position sensor 31 that may be internal or external to the process control device 13. As illustrated in FIG. 1, the measurement unit 30 may detect the command signal delivered to the I/P unit 14 (which may be integral with the positioner) via a current sensor 32 as the control signal and may detect the valve position at the output of the valve 18 (via the position sensor 31) as the response indication. Alternatively, or in addition, the measurement unit 30 may detect the set point signal, the error signal at the output of the summing junction 26, the pressure command signal developed by the I/P unit 14 (via a pressure sensor 34), the actuator command signal developed by the positioner 15 (via a pressure sensor 36) and/or any other signal specifying or related to the control of the process control device 13 as the control signal. Likewise, as the measurement unit 30 may measure the pressure command signal from the positioner 15, the process variable, the output of the transmitter 22 or any other signal or phenomena that indicates the movement or operation of the process control device 13 in response to a change in a control signal as the response indication. It should also be noted that other types of process control devices may have other signals or phenomena associated therewith that indicate a response to a change in a control signal which may be used by the measurement unit 30 as the response indication.

As will be evident, the measurement unit 30 may read an indication of the command signal, the pressure signal, the actuator command signal, or the valve position already provided by the positioner 15 if the positioner 15 can communicate that measurement, and/or the measurement unit 30 may detect the valve position indicated by the pressure sensor 36 or by the position sensor 31. The position sensor 31 may comprise any desired motion or position measuring device including, for example, a potentiometer, a linear variable differential transformer (LVDT), a rotary variable differential transformer (RVDT), a Hall effect motion sensor, a magneto restrictive motion sensor, a variable capacitor motion sensor, etc.

As will be understood, the measurement device 30 can measure the dead band, dead time or response time of the process control device 13 on-line in a nonobtrusive manner because it can detect these parameters based on very small movements of the process control device 13 which occur normally during control of the operation of the process 20. In other words, the measurement unit 30 does not require the process control device 13 to undergo a full stroke or test stroke sequence to determine dead band, dead time or response time. Furthermore, because the measurement unit 30 is connected to the process control loop 10 and measures the control signal and the response indication during normal operation of the process control loop 10, the measurement unit 30 determines the process control device parameters continuously without interfering with the operation of the process 20.

If desired, the measurement unit 30 may compare the determined process control device parameters with one or more stored values to determine if the measured parameters are acceptable or are within a specified range. If the determined parameters are not within the specified range, the measurement unit 30 may alert a user via a display 38 comprising, for example, a CRT screen, a printer, a voice generator, an alarm, or any other desired communication device, that the process control device 13 may need to be repaired or replaced. Also, if desired, the measurement unit 30 may provide a list of the measured device parameters to the user via the display 38.

To measure the dead band of the process control device 13 on-line, the measurement unit 30 first detects or measures control signals that control the device 13 and the response of the process control device 13 to those sets of control signals. The measurement unit 30 then searches for reversals in the control signals, i.e., points at which the control signals specify a change in the direction of the movement of the moveable element of the process control device 13. A reversal occurs when, for example, the process controller 12 causes the process control device 13 to increase the valve position, sends a constant signal for a discrete amount of time, and then sends a signal that causes the process control device 13 to decrease the valve position. Upon detecting a reversal in the control signal, the measurement unit 30 waits until valve movement in the reverse direction (e.g., the decreasing direction) actually occurs and determines the dead band as the difference between the control signal at which valve movement last occurred in the first (e.g., the increasing) direction and the control signal at which valve movement first occurred in the reverse (the decreasing) direction.

If desired, the measurement unit 30 can recognize each reversal of the control signal, determine the dead band associated with that reversal, and store each of the detected reversals and dead bands as separate measurements of the dead band of the process control device 13 to provide the operator with a continuous history of the dead band of the process control device 13. Also, if desired, the measurement unit 30 can combine the separate measurements of the dead band into an overall dead band measurement by, for example, averaging one or more of the dead band measurements together. Furthermore, the measurement unit 30 can compare each of the dead band measurements with one or more limits specifying a valid range for the dead band and, when the measured dead band is outside of the valid range, can alert an operator that the process control device 13 needs to be repaired or replaced to assure efficient operation of the process control loop 10.

Likewise, the measurement unit 30 may determine the dead time of the process control device 13 by detecting a change in the command signal delivered by the process controller 12 and then measuring the amount of time that occurs before any valve movement occurs in response to that change in the command signal. Still further, the measurement unit 30 may measure the response time of the process control device 13 by detecting a change in the command signal delivered by the process controller 12 and then measuring the amount of time it takes the valve 18 to reach a predetermined percentage, for example 63 percent, of the final value of the full change in valve position that occurs as a result of the change in the command signal. The predetermined percentage may be specified by, for example, an operator or a control loop designer. Of course the measurement unit 30 may measure the dead time or response time when the process control device 13 is moving up or down through a dead band or when the process control device 13 is not moving through a dead band. If desired, the measurement unit 30 may combine these different measurements in any manner to provide a statistical measurement of the dead time or the response time of the process control device 13. As will be evident, the measurement unit 30 includes a clock or other timing device to measure the dead time or the response time.

As with the measurement of dead band, the measurement unit 30 may discard sets of data if, for example, the magnitude or rate of change of the command signal is too small or too great, the amount of time measured is too small or too great (potentially indicating that some other problem is present within the process control loop 10 or the measurement unit 30), etc. Likewise, similar to the dead band, the dead time or the response time of the process control device 13 may be measured with respect to changes in the set point, the output of the summing junction 26, or the process variable or with respect to any other control signal or response indication associated with the process control device 13.

Still further, the measurement unit 30 may measure any other desired process control device parameters on-line as long as such other process control device parameters may be determined from one or more values of a control signal or one or more values of a signal indicating a response of the process control device to a control signal.

Figure 2A:
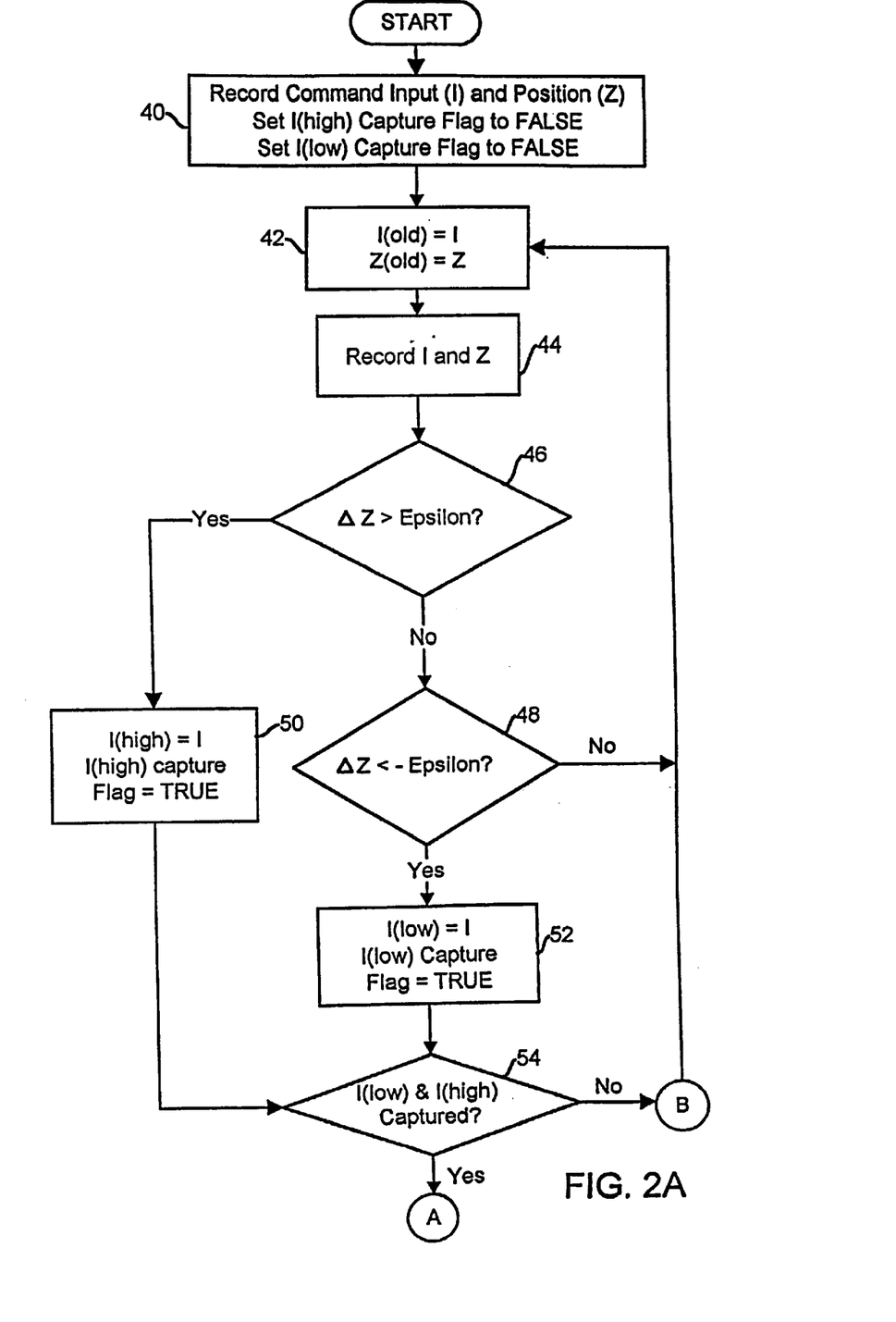
FIGS. 2A and 2B comprise a flowchart of a method for nonobtrusively determining the dead band of a process control device on-line according to the present invention.
Figure 2B:
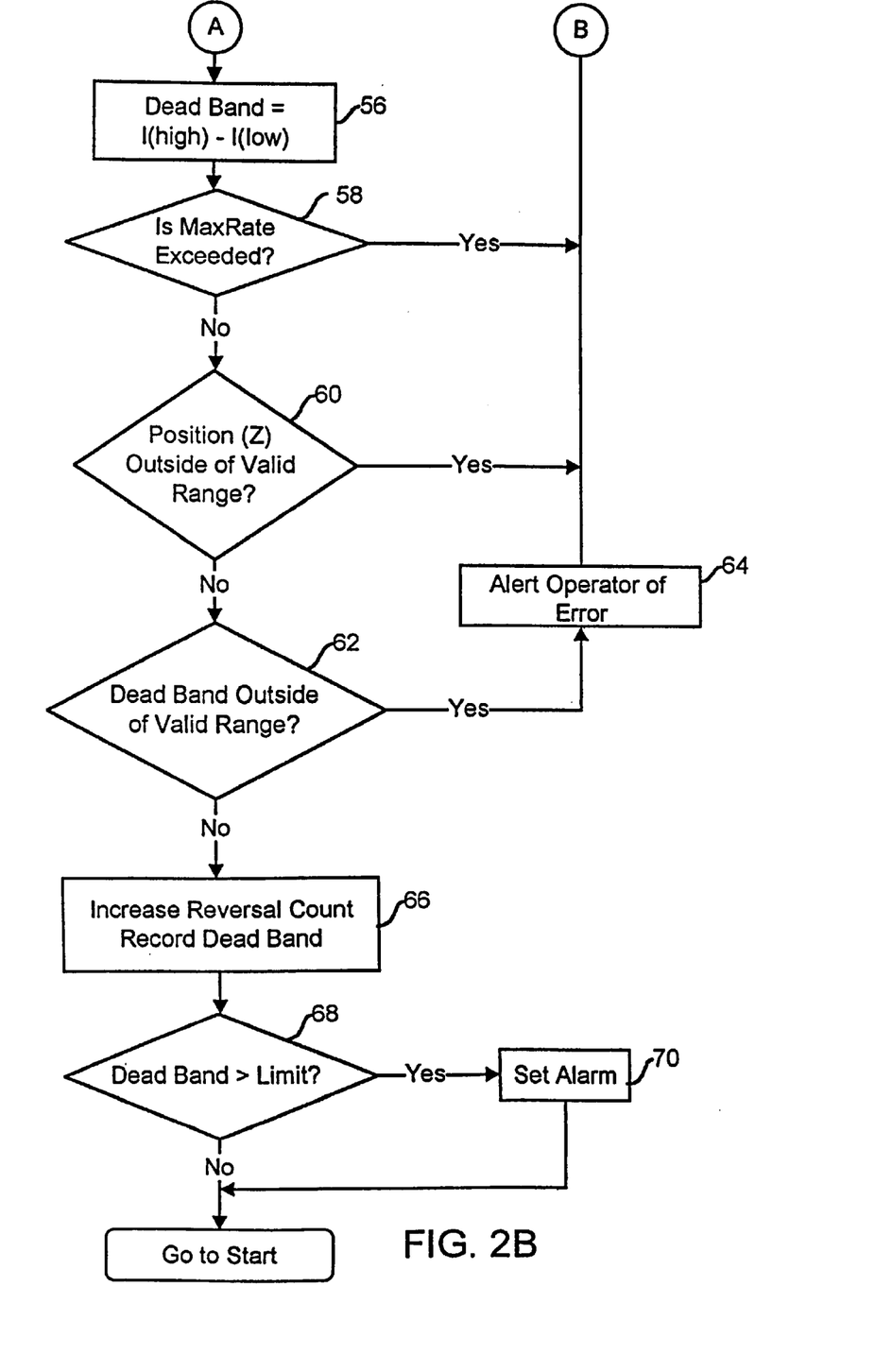
Figure 3:
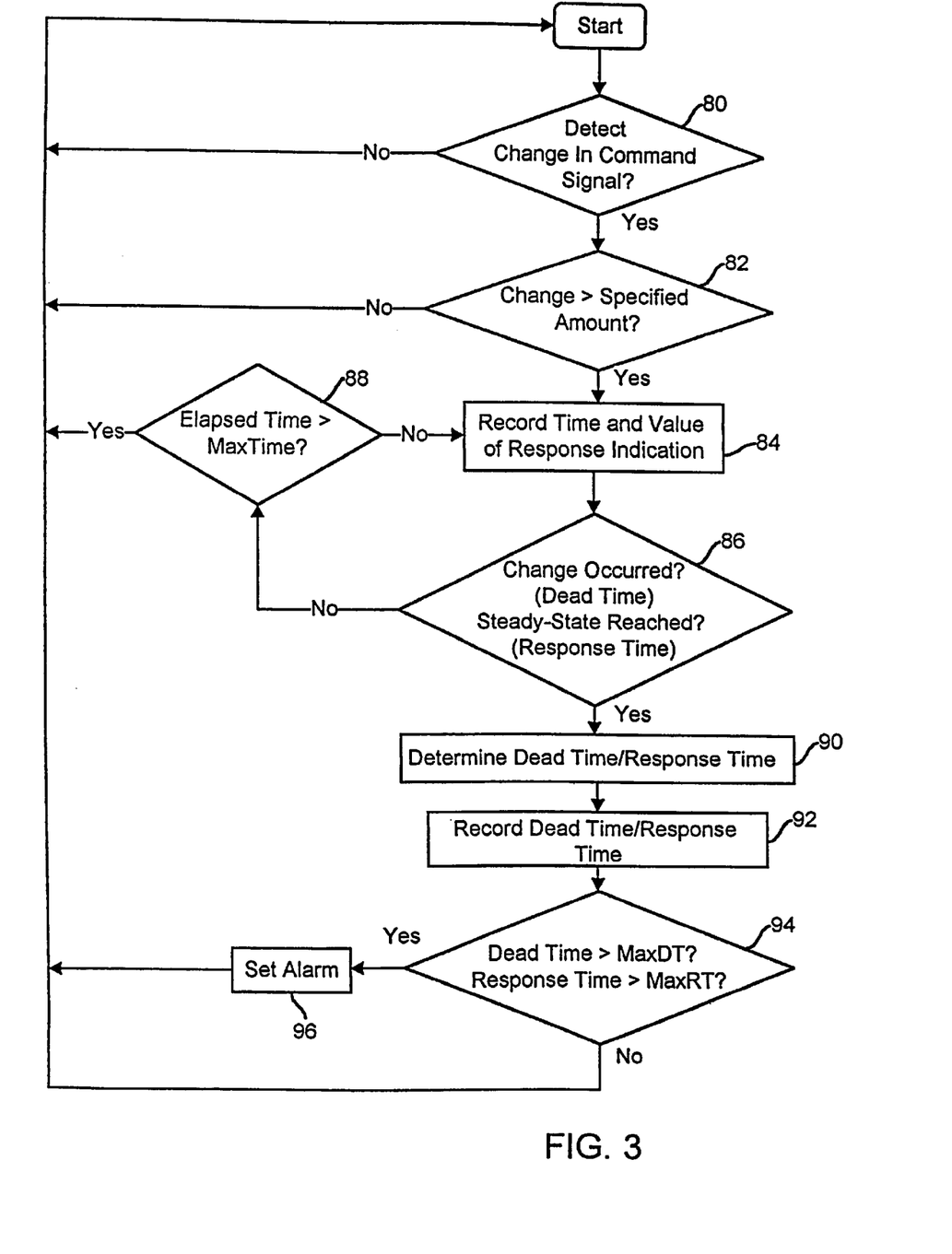
FIG. 3 comprises a flowchart of a method for nonobtrusively determining the dead time or the response time of a process control device on-line according to the present invention.

The measurement unit 30 may be implemented as any desired hardwired logic device or software controlled processing device, such as a microprocessor, that is capable of detecting and storing a control signal and a response indication and of determining one or more device parameters, such as dead band, dead time, and response time of the process control device 13 therefrom. FIGS. 2A, 2B, and 3 comprise flowcharts illustrating the operation of the measurement unit 30 when the measurement unit 30 is used to determine the dead band, dead time, or response time of the process control device 13 and, as will be understood, the steps within the flowcharts of FIGS. 2A, 2B, and 3 can be implemented in software, hardware, firmware, or any combination thereof in any desired manner.

Referring now to FIG. 2A, to measure the dead band of process control device 13, a block 40 records sequential sets of, for example, the command signal provided from process controller 12 to the I/P unit 14, which is indicated in FIG. 2A as Input (I). The block 40 may also record values of the valve position 18 associated with the recorded command signals, indicated in FIG. 2A as Position (Z). In addition, the block 40 sets I(high) and I(low) Capture Flags to false. A block 42 records previous values of the Input (1) and the Position (Z) as I(old) and Z(old), respectively, to be used for later comparison.

Next, a block 44 detects and records the present values of the command signal I and the valve position Z. If desired, the block 44 may wait until the command signal or the valve position reaches near-quiescent conditions before recording these values.

A block 46 examines whether the change in position $\Delta Z$ between the present reading and the previous reading, i.e., Z—Z(old), is greater than some threshold, epsilon (where $\epsilon$ is greater than or equal to zero). If the change in position $\Delta Z$ is greater than $\epsilon$, then a block 50 records the command signal as I(high) and sets the I(high) Capture Flag to true to indicate that I(high) has been captured. Alternatively, a block 48 examines whether the change in position $\Delta Z$ between the present reading and the previous reading is less than some threshold, minus epsilon (where $-\epsilon$ is less than or equal to zero). If the change in position $\Delta Z$ is less than $-\epsilon$, then a block 52 records the command signal as I(low) and sets an I(low) Capture Flag to true to indicate that I(low) has been captured. Clearly, if the valve continues to move in one direction, values for I(high) and I(low) are updated as required.

Next, a block 54 determines whether I(high) and I(low) have been captured. If both I(high) and I(low) have been captured, a block 56 calculates the dead band as the difference between I(high) and I(low), i.e., the difference between the command signals at which the process control device 13 entered into an exited from the dead band. Otherwise, new command and position signals are captured at the block 42.

When an I(high) and an I(low) have been captured at the block 54, a block 58 determines if the command signal is changing at a rate greater than a specified rate indicated by a MaxRate variable. If the command signal is changing at a rate greater than that specified by the MaxRate variable, then control is returned to the block 42 and the dead band calculation under construction is abandoned. The operation of the block 58 prevents measurements of the dead band when the command signal is changing too rapidly to provide an accurate indication of the dead band. More specifically, the block 58 prevents measurement of the dead band of the process control device 13 when the process controller 12 is changing the command signal at a rate greater than the rate at which the process control device 13 can respond to the command signal (i.e., at a rate greater than the natural input/output response characteristic of the process control device 13). Determining the dead band during these times would result in the measurement unit 30 over-estimating the command signal required to exit the dead band. Of course, the value of the MaxRate variable can be set in any manner but, preferably is related to the input/output response characteristic of the process control device 13.

If the command signal is not changing at a rate greater than that specified by the MaxRate variable, a block 60 determines if the valve position is greater than an upper limit or is lower than a lower limit to detect if the moveable element of the valve 18 is in a position at which dead band measurements may be unreliable. Such unreliable dead band calculations may occur when, for example, the movable member of the valve 18 is at the end of its travel limit or is otherwise subjected to abnormally high frictional forces. If the valve position does not fall within a valid range, control is returned to the block 42 and the dead band calculation currently under construction is abandoned.

However, when the valve position is within the valid range, a block 62 compares the dead band calculation to an upper and a lower limit to determine whether the calculated dead band is within a reasonable or valid range so as to assure that the dead band calculation is not unreasonably small or large. If the dead band calculation is too small or too large as determined by preset range limits, then an error may have occurred. In such a case, a block 64 alerts the operator of the potential error and returns control to the block 42, again abandoning or disabling the dead band calculation being developed.

If the block 62 determines that the dead band is within the valid range, a block 66 increases the reversal count indicating that another reversal has occurred and records or stores the dead band calculation in memory along with any other desired information pertaining to the dead band (such as the time, valve position, etc. associated with the dead band). A block 68 then determines whether the dead band is greater than a limit and, if so, a block 70 sets an alarm or otherwise indicates the presence of the high dead band measurement to an operator. Thereafter, the process is repeated to determine the next dead band measurement.

If desired, the block 66 may store one or more of the calculated dead bands and calculate an average or some other combination of those dead band measurements to produce a statistical measure of the dead band of the process control device 13. Of course, the blocks 58, 60, 62, or 68 may be selectively disabled either by an operator or automatically based on a set of predetermined conditions. Still further, other tests may be performed to determine the dead band and other methods of combining particular dead band calculations may be used in conjunction with those described herein.

Referring now to FIG. 3, a flowchart which may be implemented by the measurement unit 30 to calculate or determine the dead time or the response time of the process control device 13 is illustrated. A block 80 repeats itself until it detects a change in the command signal or other control signal used to control the process control device 13. When a change is detected, a block 82 determines if the change is greater than a specified amount which may be, for example, the most recently calculated or observed dead band plus some predetermined percentage thereof, such as one percent. If the change in the command signal is not greater than the specified amount, control returns to the block 80.

However, when the block 82 detects a change in the command signal greater than the specified amount, a block 84 records the time and records the value of the response indication (e.g., the valve position). A block 86 then determines if a change in the response indication has occurred. If not, a block 88 determines if the elapsed time since detecting the change in the command signal is greater than a specified amount, illustrated in FIG. 3 as the MaxTime variable. If the elapsed time is greater than the MaxTime variable, which indicates that no change in the response indication is likely to occur because, for example, the process control device 13 is within a dead band, then control returns to the block 80 and the dead time data currently under construction is abandoned. However, if the elapsed time is not greater than the MaxTime variable at the block 88, control is returned to the block 84 which records a new time and response indication. In this manner, the blocks 84, 86, and 88 wait for a change in the response indication to occur or wait until a predetermined amount of time has elapsed before continuing. Of course, if desired, the block 86 may determine if the detected change is greater than a predetermined amount and/or is in the expected direction to prevent noise in the response indication from causing an inaccurate measurement of the dead time or response time.

When the block 86 detects a change in the response indication, then a block 90 measures the dead time as the time elapsed between the receipt of the change in the command signal and the detection of the first change in the response indication as a result of the change in the command signal. A block 92 then stores this dead time calculation.

If response time is being measured, the block 84 records successive values of the response indication as it changes in response to a change in the command signal. The block 86 detects if the response indication has reached a predetermined percentage change of the command signal (such as 63%) and, if not, the block 88 detects if the elapsed time is greater than the MaxTime variable (which may be set to a different value than the same variable used for the dead time measurement). If the block 88 determines that the elapsed time is greater than the MaxTime variable, indicating that the command signal may have undergone one or more changes since the detection of the first change in the command signal at the block 80, the response time calculation is abandoned and control is returned to the block 80. However, if the elapsed time is not greater than the MaxTime variable at the block 88 and the response indication has not reached a predetermined percentage of the command signal change, control is returned to the block 84 where the response indication and time is again recorded. The blocks 84, 86, and 88 repeat to record the history of the response indication as it varies in response to the change in the command signal.

When the response indication reaches a steady state, the block 90 determines the difference between the time the command signal changed and the time it took the response indication to reach the specified percentage change of the command signal. The block 92 may then store this determined time as the response time of the process control device 13. Of course, if necessary, the block 90 may interpolate between the recorded points to determine the response time. Furthermore, the block 90 may determine if another change in the command signal (recorded by, for example, the block 84) has occurred during the operation of the blocks 84, 86, and 88 and, if so, may discard the calculated response time because it is based on two or more changes in the command signal.

A block 94 determines if the recorded dead time or response time is greater than a maximum allowable amount, illustrated in FIG. 3 as the MaxDT and MaxRT variables. If one or both of the dead time or response time is above the MaxDT or the MaxRT amount, respectively, a block 96 sets an alarm indicating to a user or operator that the dead time or the response time is greater than the maximum desirable amount and that, therefore, the process control device 13 or some component thereof may need to be repaired or replaced. Control is then returned to the block 80 to perform the next dead time or response time calculation.

Similar to the dead band calculation, the particular measured dead times or response times of the process control device 13 can be averaged together or otherwise statistically combined to provide an overall dead time or response time measurement for the process control device 13 at any given moment. Also, if desired, the dead band, dead time, or response times can periodically, or at an operator's request, be provided to the operator through a display screen, printer, or some other output device. Of course, the steps illustrated of FIGS. 2A, 2B, and 3 may be combined so that the operator is alerted when any combination of one or more of the dead band, dead time, and/or response time measurements indicates that the process control device 13 is responding abnormally or out of specification and may need repair or replacement.

Although FIGS. 2A, 2B, and 3 illustrate the case in which the measurement unit 30 measures or determines the dead band, dead time, and response time of the process control device 13 using the command signal and the valve position, as noted above, other control signals and response indications can be used as well.

While the present invention has been described with reference to specific examples, which are intended to be illustrative only, and not to be limiting of the invention, it will be apparent to those of ordinary skill in the art that changes, additions or deletions may be made to the disclosed embodiments without departing from the spirit and scope of the invention.

We claim:

1. An apparatus for determining a device parameter associated with a process control device when the process control device is connected on-line within a process, the apparatus comprising:

means for detecting a change in a control signal that controls the process control device;

means for measuring an indication of the response of the process control device to the change in the control signal; and means for calculating the device parameter from the detected change in the control signal and the response indication to produce a signal indicative of the device parameter.

2. The apparatus of claim 1, wherein the device parameter is dead band and wherein the calculating means includes means for determining the dead band of the process control device.

3. The apparatus of claim 2, wherein the determining means includes second means for detecting a set of successive control signals specifying a direction reversal for the process control device and means for observing a change in a magnitude of the control signal necessary to cause a change in the response indication as a result of the direction reversal for the process control device.

4. The apparatus of claim 1, wherein the process control device is a valve and wherein the response indication indicates a valve position.

5. The apparatus of claim 1, wherein the process control device controls a process variable within the process and wherein the response indication indicates a value of the process variable.

6. The apparatus of claim 1, wherein the calculating means includes means for disabling the calculating means when the control signal changes at a rate greater than a specified rate.

7. The apparatus of claim 1, wherein the calculating means includes means for comparing the response indication to a limit specifying a valid range and means for disabling the calculating means when the response indication is outside of the valid range.

8. The apparatus of claim 1, further including a detector that detects if the calculated device parameter meets a predetermined criteria and means for alerting a user when the calculated device parameter fails to meet the predetermined criteria.

9. An apparatus for determining a device parameter associated with a process control device when the process control device is connected on-line within a process, the apparatus comprising:

means for detecting a change in a control signal that controls the process control device;

means for measuring an indication of the response of the process control device to the change in the control signal; and means for calculating the device parameter from the detected change in the control signal and the response indication;

wherein the device parameter is dead time and wherein the calculating means includes means for determining the dead time of the process control device.

10. The apparatus of claim 9, wherein the determining means includes further means for detecting a change in the control signal over a predetermined amount and means for observing the amount of time it takes the response indication to change after the control signal changes over the predetermined amount.

11. An apparatus for determining a device parameter associated with a process control device when the process control device is connected on-line within a process, the apparatus comprising:

means for detecting a change in a control signal that controls the process control device;

means for measuring an indication of the response of the process control device to the change in the control signal; and means for calculating the device parameter from the detected change in the control signal and the response indication;

wherein the device parameter is response time and wherein the calculating means includes means for determining the response time of the process control device.

12. The apparatus of claim 11, wherein the determining means includes further means for detecting a change in the control signal over a predetermined amount and means for observing the amount of time it takes the response indication to reach a predetermined percentage of a final value.

13. The apparatus of claim 1, wherein the process control device includes a positioner coupled to a valve.

14. An apparatus for determining the dead band of a process control device when said process control device is connected within a process to control a process variable, the apparatus comprising:

means for detecting successive values of a control signal that controls the process control device while the process control device is connected on-line within the process;

means for measuring an indication of a response of the process control device to each of the successive values of the control signal; and means coupled to the detecting means and to and the measuring means for determining the dead band of the process control device from the successive values of the control signal and from the response indications associated with the successive values of the control signals to produce a signal indicative of the dead band.

15. The apparatus of claim 14, wherein the determining means includes further means for detecting a reversal in the direction of the control signal from the detected successive values of the control signal.

16. The apparatus of claim 15, wherein the process control device includes a member that changes position in response to a change in the control signal and wherein the determining means further includes means for calculating the change in position of the process control device member as a result of the reversal in the direction of the control signal.

17. The apparatus of claim 15, wherein the process control device causes a change in the process variable in response to a change in the control signal and wherein the determining means further includes means for calculating the change in the process variable as a result of the reversal of the direction of the control signal.

18. The apparatus of claim 14, further including a detector that detects if the determined dead band meets a predetermined criteria and means for alerting a user when the dead band fails to meet the predetermined criteria.

19. A method of determining a device parameter associated with a process control device when the process control device is connected on-line within a process and is controlled by a control signal, the method comprising the steps of:

detecting a change in the control signal;

measuring an indication of the response of the process control device to the change in the control signal; and calculating the device parameter from the detected change in the control signal and from the response indication to produce a signal indicative of the device parameter.

20. The method of claim 19, wherein the device parameter is dead band and wherein the step of calculating includes the step of determining the dead band of the process control device.

21. The method of claim 20, wherein the step of determining includes the steps of detecting a set of successive control signals specifying a direction reversal that results in a change in the response indication and observing a change in a magnitude of the detected set of control signals that caused the change in the response indication.

22. The method of claim 19, further including the steps of detecting if the calculated device parameter meets a predetermined criteria and alerting a user when the calculated device parameter fails to meet the predetermined criteria.

23. A method of determining a device parameter associated with a process control device when the process control device is connected on-line within a process and is controlled by a control signal, the method comprising the steps of:

detecting a change in the control signal;

measuring an indication of the response of the process control device to the change in the control signal; and calculating the device parameter from the detected change in the control signal and from the response indication;

wherein the device parameter is dead time and wherein the step of calculating includes the step of determining the dead time of the process control device.

24. A method of determining a device parameter associated with a process control device when the process control device is connected on-line within a process and is controlled by a control signal, the method comprising the steps of:

detecting a change in the control signal;

measuring an indication of the response of the process control device to the change in the control signal; and     calculating the device parameter from the detected change in the control signal and from the response indication;

wherein the device parameter is response time and wherein the step of calculating includes the step of determining the response time of the process control device.

25. The method of claim 24, wherein the step of determining includes the steps of detecting a change in the control signal and measuring the amount of time for the response indication to reach a certain percentage of a final value after the control signal changes over the predetermined amount.

26. An apparatus for determining a device parameter associated with a process control device when the process control device is connected on-line within a process control system having a processor, the apparatus comprising:

a computer-readable memory; and a software routine stored on the computer-readable memory and adapted to be executed by the processor, wherein the software routine performs the steps of;

detecting a change in a control signal that controls the process control device;

determining an indication of the response of the process control device to the change in the control signal; and         calculating the device parameter from the detected change in the control signal and the response indication.

27. The apparatus of claim 26, wherein the device parameter is dead band and the software routine performs the step of calculating the dead band of the process control device.

28. The apparatus of claim 27, wherein the software routine further performs the steps of:

detecting a set of successive control signals specifying a direction reversal for the process control device; and     determining a change in a magnitude of the control signal necessary to cause a change in the response indication as a result of the direction reversal for the process control device.

29. The apparatus of claim 26, wherein the process control device comprises a valve and the response indication indicates a valve position.

30. The apparatus of claim 26, wherein the software routine performs the step of determining whether the control signal is changing at a rate greater than a specified rate.

31. The apparatus of claim 26, wherein the software routine performs the step of determining whether the response indication is within a predetermined valid range.

32. The apparatus of claim 26, wherein the software routine performs the step of determining whether the calculated device parameter meets a predetermined criterion.

\* \* \* \* \*